United States Patent
Lim et al.

(10) Patent No.: US 11,821,480 B2
(45) Date of Patent: Nov. 21, 2023

(54) ELECTRO-MECHANICAL BRAKE AND VEHICLE HAVING THE SAME

(71) Applicant: HL MANDO CORPORATION, Gyeoggi-do (KR)

(72) Inventors: Woochul Lim, Gyeonggi-do (KR); Dae June Jung, Gyeonggi-do (KR); Joon-Kyu Song, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/974,719

(22) Filed: Oct. 27, 2022

(65) Prior Publication Data
US 2023/0131753 A1  Apr. 27, 2023

(30) Foreign Application Priority Data
Oct. 27, 2021 (KR) .......................... 10-2021-0144601

(51) Int. Cl.
*B60T 13/74* (2006.01)
*F16D 65/18* (2006.01)
(Continued)

(52) U.S. Cl.
CPC .......... *F16D 65/18* (2013.01); *F16D 2125/40* (2013.01); *F16D 2125/50* (2013.01)

(58) Field of Classification Search
CPC .. F16D 65/18; F16D 2125/40; F16D 2125/50; F16D 2121/24; B60T 13/741
See application file for complete search history.

(56) References Cited

U.S. PATENT DOCUMENTS

| 4,793,447 A | * | 12/1988 | Taig | ...................... F16D 55/224 475/342 |
| 4,804,073 A | * | 2/1989 | Taig | ........................ F16D 65/18 475/342 |

(Continued)

FOREIGN PATENT DOCUMENTS

| DE | 689 01 721 T2 | 2/1993 |
| KR | 10-2002-0073334 | 9/2002 |

(Continued)

OTHER PUBLICATIONS

Notice of Allowance dated May 16, 2022 for Korean Patent Application No. 10-2021-0144601 and its English translation provided by Applicant's foreign counsel.
(Continued)

*Primary Examiner* — Nicholas J Lane
(74) *Attorney, Agent, or Firm* — Ladas & Parry, LLP

(57) ABSTRACT

Provided are an electromechanical brake and a vehicle including the same. An electromechanical brake according to an embodiment of the present disclosure includes a pair of brake pads disposed at two opposite sides of a disc and include a hollow motor configured to provide rotational driving power and having an internal space penetratively formed in a direction in which a rotation axis extends, a nut configured to rotate about the rotation axis of the motor, a Power train coupled to a front side of the motor and configured to transmit the rotational driving power of the motor to the nut, and a pressing screw coupled to the nut and configured to advance or retreat toward the brake pad.

14 Claims, 8 Drawing Sheets

(51) Int. Cl.
*F16D 125/50* (2012.01)
*F16D 125/40* (2012.01)

(56) References Cited

U.S. PATENT DOCUMENTS

| | | | | |
|---|---|---|---|---|
| 4,836,338 | A * | 6/1989 | Taig | F16H 25/20 |
| | | | | 188/161 |
| 4,850,457 | A | 7/1989 | Taig | |
| 4,850,459 | A * | 7/1989 | Johannesen | B60T 13/741 |
| | | | | 188/162 |
| 6,739,436 | B1 * | 5/2004 | Kapaan | F16D 65/18 |
| | | | | 188/162 |
| 8,851,242 | B2 * | 10/2014 | Kim | B60T 13/741 |
| | | | | 188/72.1 |
| 2002/0104718 | A1 * | 8/2002 | Suzuki | B60T 17/22 |
| | | | | 188/72.1 |
| 2002/0185340 | A1 * | 12/2002 | Kojima | F16D 65/18 |
| | | | | 188/72.8 |
| 2004/0112690 | A1 | 6/2004 | Sekiguchi | |
| 2005/0092558 | A1 * | 5/2005 | Kapaan | F16D 65/18 |
| | | | | 188/156 |
| 2007/0068746 | A1 * | 3/2007 | Chittka | F16D 65/18 |
| | | | | 188/72.6 |
| 2007/0068748 | A1 * | 3/2007 | Chittka | F16D 65/18 |
| | | | | 188/72.7 |
| 2008/0271553 | A1 * | 11/2008 | Wang | F16D 65/18 |
| | | | | 74/89.34 |

FOREIGN PATENT DOCUMENTS

| | | |
|---|---|---|
| KR | 10-2014-0140851 | 12/2014 |
| KR | 10-2020-0098219 | 8/2020 |
| KR | 10-2021-0002010 | 1/2021 |
| KR | 10-2021-0005532 | 1/2021 |
| KR | 10-2021-0042587 | 4/2021 |
| KR | 10-2021-0077001 | 6/2021 |
| WO | 89/10496 | 11/1989 |

OTHER PUBLICATIONS

Office Action dated Feb. 15, 2022 for Korean Patent Application No. 10-2021-0144601 and its English translation from Global Dossier.
Office Action dated Jun. 7, 2023 for German Patent Application No. 10 2022 211 388.8 and its English translation by Google Translate.
Office Action dated Jun. 9, 2023 for Chinese Patent Application No. 202211328298.X and its English translation by Google Translate.

* cited by examiner

<CROSS-SECTIONAL VIEW TAKEN ALONG LINE A-A>

ELECTRO-MECHANICAL BRAKE AND VEHICLE HAVING THE SAME

CROSS REFERENCE TO RELATED APPLICATION

The present application claims priority to Korean Patent Application No. 10-2021-0144601, filed Oct. 27, 2021, the entire contents of which is incorporated herein for all purposes by this reference.

BACKGROUND

Technical Field

The present disclosure generally relates to an electromechanical brake and a vehicle including the same, and more particularly, to an electromechanical brake and a vehicle including the same, which provide a pressing force by using rotational driving power of a motor.

Description of the Related Art

In general, a brake device refers to a device for stopping a vehicle to prevent the vehicle from moving when the vehicle is braked or parked. The brake device serves to hold a wheel of the vehicle to prevent the wheel from rotating.

Recently, an electromechanical brake (EMB) system for electronically controlling an operation of a brake has been developed. The electromechanical brake may not only be operated by a manual manipulation of a driver, but also be operated automatically in the case of a vehicle to which an autonomous driving system is applied. Therefore, it is possible to implement a very convenient and high-grade vehicle.

In particular, the electromechanical brake may eliminate a hydraulic line that needs to be essentially provided in a hydraulic brake in the related art. Therefore, an internal space occupied by the brake may be reduced, thereby providing a space of the vehicle as a driver-friendly space.

The electromechanical brake, which provides the braking force to the vehicle by pressing a disc of the electromechanical brake, controls a rotation of the disc by pressing the disc by using a screw or a nut by transmitting rotational driving power of the motor to a structure having the screw and the nut screw-coupled to each other.

In this case, because the rotational driving power of the motor cannot be transmitted directly to the screw or the nut, a sun gear, two ring gears, and planet gears are used to reduce a speed and transmit power to the screw or the nut. In the related art, two planet gears are provided and respectively engage with the two ring gears. This structure with the planet gears causes problems in that the number of components increases, the complicated design is required, and the power transmission efficiency deteriorates. Therefore, there is a need for a planet gear structure capable of improving the power transmission efficiency, reducing the number of components, and simplifying the design.

Document of Related Art

Korean Patent Application Laid-Open No. 10-2021-0042587 (Caliper Brake)

SUMMARY

The present disclosure is proposed to solve these problems and aims to provide an electromechanical brake capable of providing an electronically braking force without a hydraulic line.

The present disclosure also aims to provide an electromechanical brake capable of improving power transmission efficiency of a Power train for transmitting driving power of a motor.

The present disclosure also aims to provide an electromechanical brake that is relatively less damaged and has a pressing screw with a small backlash in a braking environment in which dust and foreign substances are easily produced.

Technical problems to be solved by the present disclosure are not limited to the above-mentioned technical problems, and other technical problems, which are not mentioned above, may be clearly understood from the following descriptions by those skilled in the art to which the present disclosure pertains.

To achieve the above-mentioned objects, an aspect of the present disclosure provides an electromechanical brake, which includes a pair of brake pads disposed at two opposite sides of a disc, the electromechanical brake including: a hollow motor configured to provide rotational driving power and having an internal space penetratively formed in a direction in which a rotation axis extends; a nut configured to rotate about the rotation axis of the motor; a Power train coupled to a front side of the motor and configured to transmit the rotational driving power of the motor to the nut; and a pressing screw coupled to the nut and configured to advance or retreat toward the brake pad.

In this case, the Power train may include: a sun gear coupled to the motor and configured to be rotated about the rotation axis by the rotational driving power of the motor; a planet gear structure disposed outside the sun gear and including one or more planet gears each having a rear end that engages with the sun gear; a first ring gear having an inner portion that engages with the rear ends of the one or more planet gears; and a second ring gear having an inner portion that engages with front ends of the one or more planet gears, and the nut may be coupled to the second ring gear and rotate about the rotation axis together with the second ring gear.

In this case, the number of gear teeth of the first ring gear may be different from the number of gear teeth of the second ring gear.

In this case, the electromechanical brake may further include: a Guide provided at an end of the pressing screw at a side of the brake pad to prevent the pressing screw from rotating together with the nut.

In this case, the Guide may include: a plate provided outside the brake pad and disposed in parallel with the brake pad; a guide protrusion protruding from the plate; and a guide groove recessed in a front end surface of the pressing screw in a longitudinal direction of the pressing screw so that the protrusion is seated.

In this case, the guide groove may be formed at one side of the front end surface.

In this case, a second ring gear plate may be provided at a front side of the second ring gear, the second ring gear plate may have a hole formed at a center thereof, an outer peripheral surface of the nut may correspond to an inner peripheral surface of the hole so that the nut is inserted into the hole in a longitudinal direction, and an rotation stopper may be provided between the nut and the second ring gear plate and prevent the nut from rotating together with the second ring gear.

In this case, the rotation stopper may include: a first cut-out surface formed on the outer peripheral surface of the nut in a longitudinal direction of the pressing screw; and a second cut-out surface formed on the inner peripheral surface of the hole of the second ring gear plate and corresponding to the first cut-out surface.

In this case, the nut may have a support portion protruding in a radial direction from an outer peripheral surface of a front end of the nut.

In this case, the electromechanical brake may further include: a second ring gear plate provided at a front side of the second ring gear and configured to cover the front side of the second ring gear; and a thrust bearing disposed between a rear surface of the support portion and a front surface of the second ring gear plate to support a load according to an axial force of the pressing screw.

In this case, the electromechanical brake may further include: a second ring gear plate provided at a front side of the second ring gear and configured to cover the front side of the second ring gear; and a force sensor disposed between a rear surface of the support portion and a front surface of the second ring gear plate to measure a load according to an axial force of the pressing screw.

In this case, the electromechanical brake may further include: a cover configured to cover a rear end of the motor, in which at least one fixing protrusion protrudes from an outer peripheral surface of the first ring gear, and in which at least one fixing groove is formed in an inner peripheral surface of the cover so that the at least one fixing protrusion is inserted into the at least one fixing groove so that the first ring gear is fixed to the cover.

In this case, the pressing screw may be coupled to the nut by ball-screw-nut coupling.

Another aspect of the present disclosure provides an electromechanical brake, which includes a pair of brake pads disposed at two opposite sides of a disc, the electromechanical brake including: a hollow motor configured to provide rotational driving power and having an internal space penetratively formed in a direction in which a rotation axis extends; a nut configured to rotate about the rotation axis of the motor; a Power train coupled to a front side of the motor and configured to transmit the rotational driving power of the motor to the nut; and a pressing screw coupled to the nut and configured to advance or retreat toward the brake pad, in which the Power train includes: a sun gear coupled to the motor and configured to be rotated about the rotation axis by the rotational driving power of the motor; a planet gear structure disposed outside the sun gear and including one or more planet gears each having a rear end that engages with the sun gear; a first ring gear having an inner portion that engages with the rear ends of the one or more planet gears; and a second ring gear having an inner portion that engages with front ends of the one or more planet gears, and in which the nut is coupled to the second ring gear and rotates about the rotation axis together with the second ring gear, the nut extends rearward in a longitudinal direction, and a rear end of the nut is disposed in the internal space of the motor.

In this case, the electromechanical brake may further include: a cover configured to cover a rear end of the motor; and a thrust bearing disposed between an inner surface of the cover and a rear end surface of the nut to support a load according to an axial force of the pressing screw.

In this case, the electromechanical brake may further include: a cover configured to cover a rear end of the motor; and a force sensor disposed between an inner surface of the cover and a rear end surface of the nut to measure a load according to an axial force of the pressing screw.

Still another aspect of the present disclosure provides a vehicle including: the above-mentioned electromechanical brake; a vehicle wheel having one side to which the disc is coupled so that rotation axes of the vehicle wheel and the disc are coincident with each other; and the pair of brake pads disposed at the two opposite sides of the disc and coupled to the electromechanical brake.

DETAILED DESCRIPTION OF THE INVENTION

Figure 1:
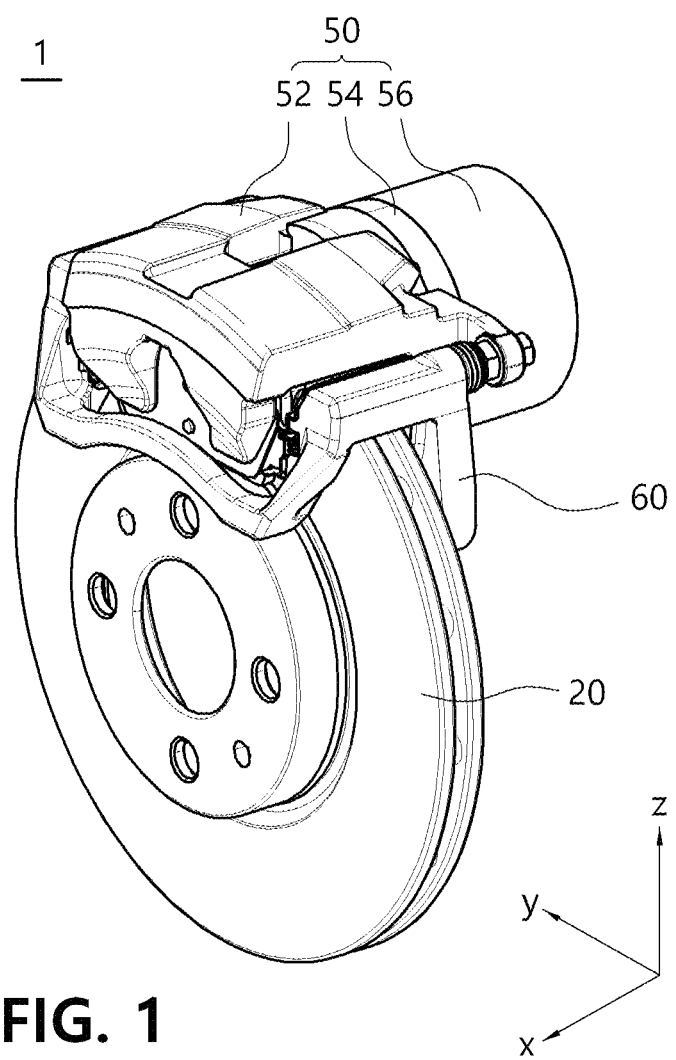
FIG. 1 is a perspective view of an electromechanical brake according to an embodiment of the present disclosure.

Hereinafter, an embodiment of the present disclosure will be described in detail with reference to the accompanying drawings so that those skilled in the technical field to which the present disclosure pertains may easily carry out the embodiment. The present disclosure may be implemented in various different ways, and is not limited to the embodiments described herein. Unless otherwise defined, the terms used in the embodiments of the present disclosure may be interpreted as the meanings commonly known to those skilled in the art. Hereinafter, the term "couple" includes not only a case in which one constituent element is directly coupled to another constituent element, but also a case in which one constituent element is indirectly coupled to another constituent element through still another constituent element.

In the drawings, a part irrelevant to the description will be omitted to clearly describe the present disclosure, and the same or similar constituent elements will be designated by the same reference numerals throughout the specification.

Hereinafter, in FIG. 1, an X-axis is defined as a forward direction, a Y-axis is defined as a leftward direction, and a Z-axis is defined as an upward direction. However, the forward direction does not mean that a disc needs to be disposed at a front side of a vehicle. The forward direction refers to a relative direction different from another direction.

The present disclosure relates to an electromechanical brake, and more particularly, to an electromechanical brake that provides a braking force by pressing a disc by using a pressing screw that is rotated by rotational driving power of a motor.

Figure 2:
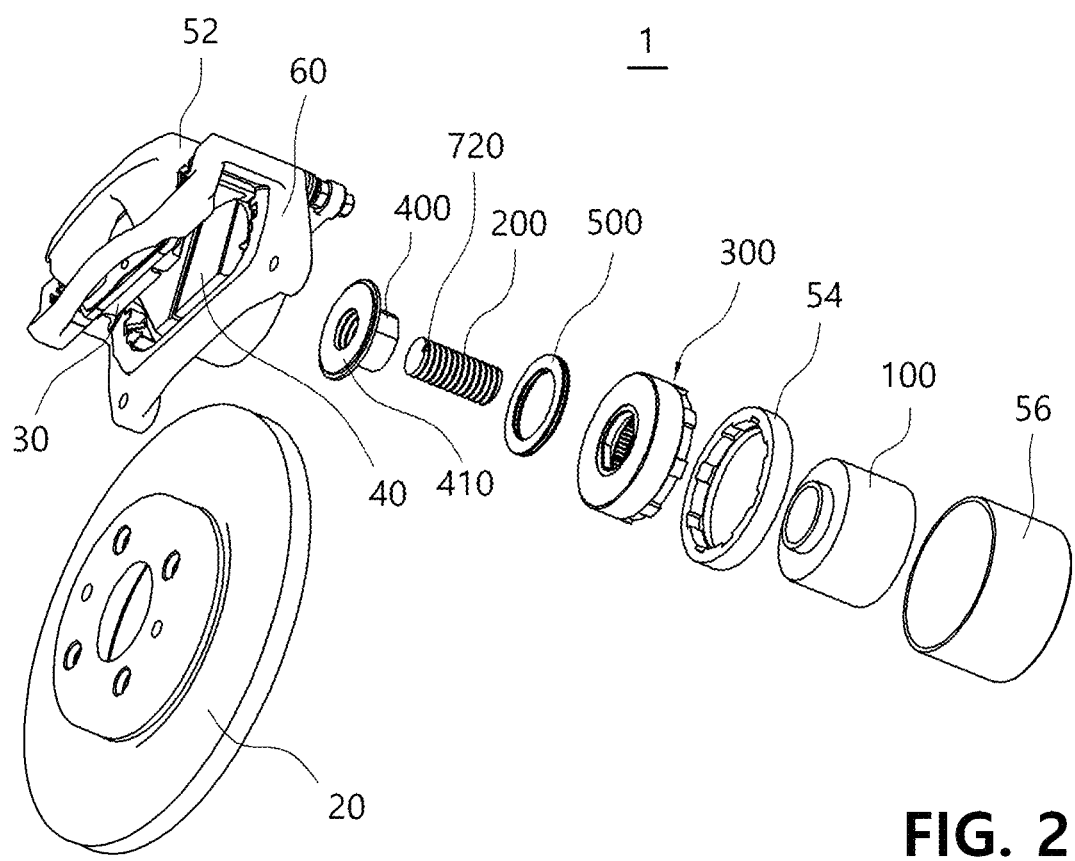
FIG. 2 is an exploded perspective view of the electromechanical brake according to the embodiment of the present disclosure.
Figure 3:
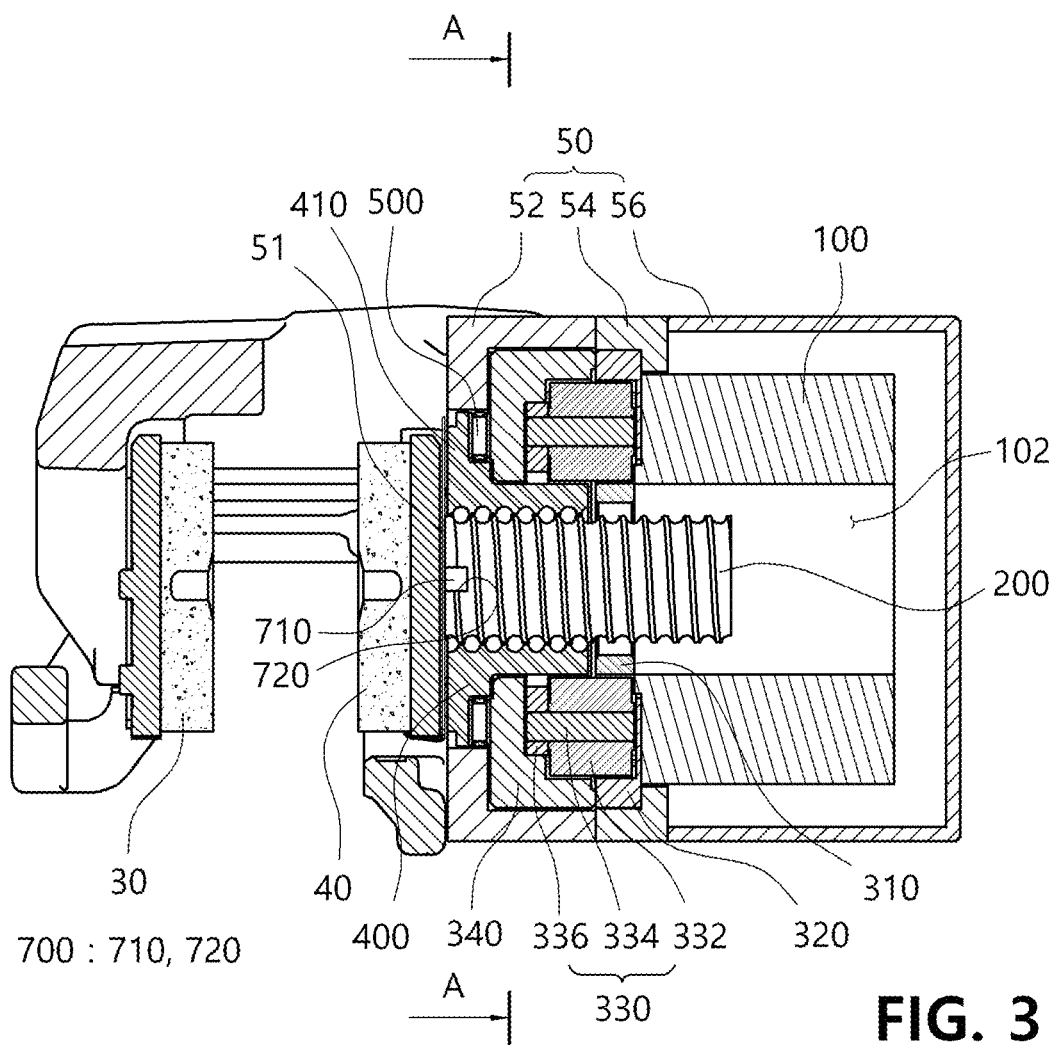
FIG. 3 is a longitudinal cross-sectional view of a pressing screw and a motor of the electromechanical brake according to the embodiment of the present disclosure.
Figure 4:
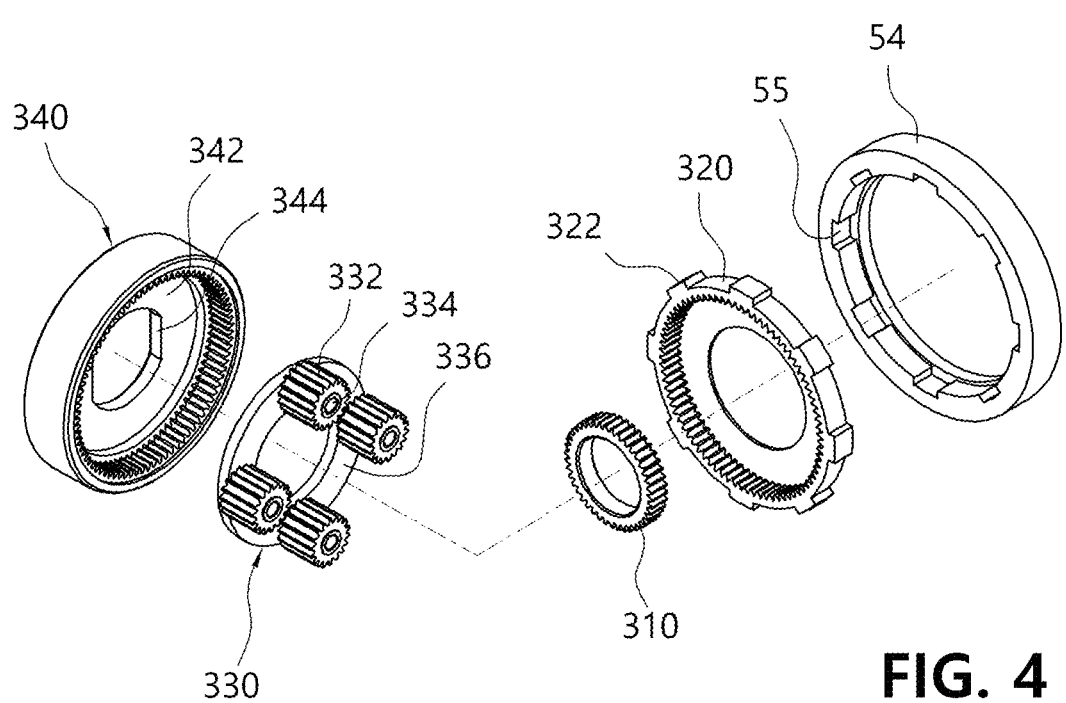
FIG. 4 is an exploded perspective view of a Power train of the electromechanical brake according to the embodiment of the present disclosure.
Figure 5:
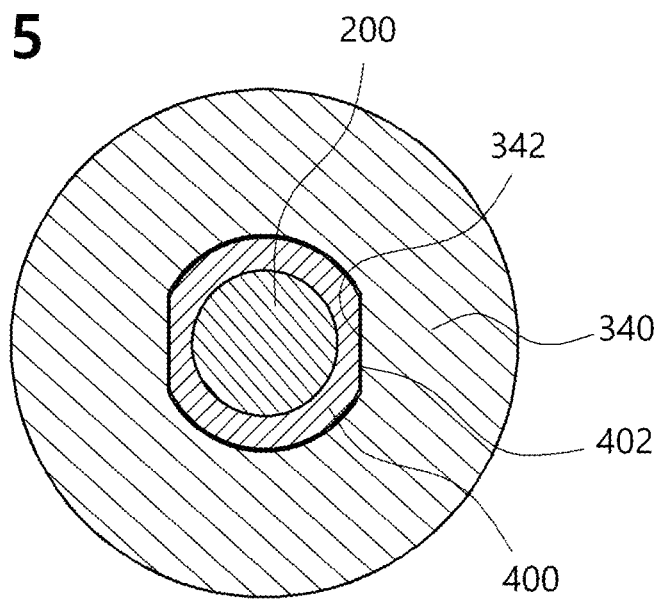
FIG. 5 is an enlarged cross-sectional view of a cross-section taken along line A-A in FIG. 3.

FIG. 1 is a perspective view of an electromechanical brake according to an embodiment of the present disclosure. FIG. 2 is an exploded perspective view of the electromechanical brake according to the embodiment of the present disclosure. FIG. 3 is a longitudinal cross-sectional view of a pressing screw and a motor of the electromechanical brake according to the embodiment of the present disclosure. FIG. 4 is an exploded perspective view of a Power train of the electromechanical brake according to the embodiment of the present disclosure. FIG. 5 is an enlarged cross-sectional view of a cross-section taken along line A-A in FIG. 3.

An electromechanical brake 1 according to an embodiment of the present disclosure includes a first brake pad 30 and a second brake pad 40, which are a pair of brake pads, a housing 50, a motor 100, and a carrier 60. In this case, the housing 50 includes a front housing 52, a cover fixing member 54, and a cover 56.

Referring to FIGS. 1 to 3, the first brake pad 30 and the second brake pad 40 have surfaces respectively disposed adjacent to front and rear surfaces of a disc 20. As illustrated in FIG. 2, the first brake pad 30 is coupled to a front side of the front housing 52. The carrier 60 may be installed in the front housing 52 and extended or retracted relative to the disc 20. In this case, the second brake pad 40 is coupled to the carrier 60.

The cover fixing member 54 is coupled to a rear side of the front housing 52. The cover fixing member 54 fixes a first ring gear 320 therein. The cover 56 having a cup shape is coupled to a rear side of the cover fixing member 54. In this case, the cover 56 protects the motor 100 so that the motor 100 is not exposed to outside foreign substances. The shape of the cover 56 is not limited, as long as the cover 56 may have a space therein and be configured such that the component is fixed to the cover 56.

As illustrated in FIG. 2, the motor 100 is fixed to the rear side of the front housing 52 and provides power that allow the second brake pad 40 or both the first brake pad 30 and the second brake pad 40 to move to the disc 20 and press the disc 20. In this case, the type of motor, such as DC, BLDC (brushless DC), and AC motors, are not limited as long as the motor 100 may provide the rotational driving power.

As illustrated in FIG. 2, the motor 100 is a hollow motor 100 having a penetratively formed center. Therefore, as illustrated in FIG. 3, an internal space 102 is formed at a center of the hollow motor 100 and extends in a longitudinal direction. A rear end of a pressing screw 200 to be described below may be disposed in the internal space 102. It is possible to reduce a size of the electromechanical brake 1 by using the internal space 102 of the hollow motor 100 as described above.

As illustrated in FIG. 3, the motor 100 provides the rotational driving power through a front end thereof. A Power train 300 to be described below is installed at a front side of the motor 100.

As illustrated in FIG. 2, the electromechanical brake 1 according to the embodiment of the present disclosure includes the pressing screw 200, the Power train 300, and the nut 400 to press the second brake pad 40 by using the rotational driving power of the motor 100.

As illustrated in FIG. 2, the pressing screw 200 has a cylindrical shape extending in the longitudinal direction and moves forward or rearward by receiving the rotational driving power of the motor 100. As illustrated in FIG. 3, the pressing screw 200 is disposed so that the movement direction thereof is coincident with a direction in which the rotation axis of the motor 100 extends.

As illustrated in FIGS. 2 and 3, the nut 400 is screw-coupled to an outer peripheral surface of the pressing screw 200.

In this case, the pressing screw 200 and the nut 400 may be coupled by ball-screw-nut coupling. In a brake system for providing a braking force by pressing the disc, dust may be easily produced because of friction between the brake pad and the disc. In addition, because the brake is generally provided on a wheel of the vehicle and disposed adjacent to a road surface, dust or foreign substances are easily raised when the wheel moves on the road surface. In this case, according to the electromechanical brake 1 according to the embodiment of the present disclosure, the pressing screw 200 and the nut 400 are coupled by ball-screw-nut coupling. Therefore, the pressing screw 200 and the nut 400 are less damaged even though dust is introduced between the pressing screw 200 and the nut 400, such that the durability may be improved.

In addition, because the pressing screw 200 and the nut 400 are coupled by ball-screw-nut coupling, the electromechanical brake 1 according to the embodiment of the present disclosure may more precisely control the brake because a backlash of the pressing screw 200 is small in comparison with general screw-coupling.

As illustrated in FIGS. 2 and 3, the nut 400 is coupled to the Power train 300. Therefore, the rotational driving power of the motor 100 is transmitted to the pressing screw 200 through the nut 400. When the nut 400 is rotated by the rotational driving power of the motor 100, the pressing screw 200 moves forward or rearward.

In this case, the electromechanical brake 1 according to the embodiment of the present disclosure includes a Guide 700 to convert the rotational motion of the nut 400 into the rectilinear motion of the pressing screw 200. The Guide 700 may prevent the pressing screw 200 from rotating together with the nut 400 and guide the pressing screw 200 so that the pressing screw 200 may rectilinearly move.

The Guide 700 is disposed between a front end of the pressing screw 200 and the second brake pad 40. In this case, the shape of the Guide 700 is not limited as long as the Guide 700 may prevent the rotation of the pressing screw 200 and guide the rectilinear motion.

For example, in the present embodiment, the Guide 700 includes a guide protrusion 710 and a guide groove 720. As illustrated in FIG. 3, the guide protrusion 710 protrudes toward the rear side of the second brake pad 40. In this case, a plate 51 may be provided on a rear surface of the second brake pad 40 and disposed in parallel with the second brake pad 40. Therefore, the guide protrusion 710 may protrude from a rear surface of the plate 51.

As illustrated in FIGS. 2 and 3, the guide protrusion 710 is inserted and seated in the guide groove 720. In this case, the guide groove 720 is formed in a front end surface of the pressing screw 200. A cross-sectional shape of the guide groove 720 perpendicular to a direction in which the guide groove 720 is recessed may correspond to a cross-sectional shape of the guide protrusion 710 perpendicular to a direction in which the guide protrusion 710 protrudes so that the guide protrusion 710 is seated.

In this case, the guide groove 720 may be disposed to be spaced apart from a center of the front end surface of the pressing screw 200. Therefore, even though the pressing screw 200 receives the rotational force as the nut 400 rotates, one side of the guide protrusion 710, which is inserted into the guide groove 720 disposed to be spaced apart from the rotation axis of the nut 400, may support the inner surface of the guide groove 720 and prevent the rotation of the pressing screw 200.

Therefore, the guide protrusion 710 is supported in the rotation direction and guided in the protruding direction by the guide groove 720, such that the pressing screw 200 may convert the rotational motion of the nut 400 into the rectilinear motion and move forward or rearward.

The electromechanical brake 1 according to the embodiment of the present disclosure include the Power train 300. In this case, the Power train 300 may include a sun gear 310, a planetary gear structure 330, a first ring gear 320, and a second ring gear 340.

As illustrated in FIG. 3, the sun gear 310 is coupled to the front side of the motor 100. The sun gear 310 rotates about the rotation axis of the motor 100 by receiving the rotational driving power of the motor 100. In this case, to reduce a speed of the motor 100 and transmit the rotational driving power to the pressing screw 200, the sun gear 310 is coupled to the nut 400 through the planetary gear structure 330 without being coupled directly to the nut 400.

As illustrated in FIGS. 3 and 4, the planetary gear structure 330 is disposed on an outer peripheral surface of the sun gear 310. In this case, the planetary gear structure 330 includes: one or more planet gears 332; Rotation shafts 334 configured to respectively support the planet gears 332 so that the planet gears 332 are rotatable; and a rotary body 336 to which the Rotation shafts 334 are fixed to be rotatable together with the one or more planet gears 332.

As illustrated in FIGS. 3 and 4, the rotary body 336 is disposed forward of the one or more planet gears 332 and supports the Rotation shafts 334 so that the one or more planet gears 332 may engage with the sun gear 310. To this end, the rotary body is formed in a ring shape so that the one or more planet gears 332 may be disposed around the outer peripheral surface of the sun gear 310.

The first ring gear 320 is provided outside the one or more planet gears 332. Therefore, the one or more planet gears 332 engage with an inner portion of the first ring gear 320.

In this case, as illustrated in FIG. 4, one or more fixing protrusions 322 may be formed on an outer peripheral surface of the first ring gear 320. The shape of the fixing protrusion 322 is not limited as long as the fixing protrusion 322 protrudes outward from the outer peripheral surface of the first ring gear 320. As the fixing protrusion 322 is inserted into a groove provided in the cover fixing member 54 and formed at a position corresponding to the fixing protrusion 322, the first ring gear 320 may be fixed to the housing 50. Therefore, the first ring gear 320 is fixed to the cover fixing member 54 without rotating even though the sun gear 310 and the planet gears 332 rotate.

As illustrated in FIGS. 3 and 4, the second ring gear 340 is disposed forward of the first ring gear 320. Like the first ring gear 320, the second ring gear 340 is also disposed outside the one or more planet gears 332, the one or more planet gears 332 engage with an inner portion of the second ring gear 340. Therefore, the first ring gear 320 engages with rear ends of the planet gear 332, and the second ring gear 340 engages with front ends of the planet gear 332.

More specifically, as illustrated in FIG. 4, the planet gear 332 is provided as an integrated gear so that the front and rear ends have the same gear ratio. However, the first ring gear 320 and the second ring gear 340 may be designed to be different from each other in number of gear teeth. Therefore, a reduction ratio may be determined based on a ratio of number of teeth between the first ring gear 320 and the second ring gear 340 in case that the rotational driving power of the motor 100 is transmitted from the planet gears 332 through the second ring gear 340. Because the planet gears 332 are integrated as described above, the structure may be simplified, the manufacturing may be facilitated, and the durability may be improved in comparison with a case in which two planet gears 332 are designed to be connected in the related art.

In this case, the nut 400 is fixed to the second ring gear 340, and the nut 400 rotates together with the second ring gear 340 that receives the rotational driving power of the motor 100. To this end, as illustrated in FIG. 3, a plate 342 is formed at a front side of the second ring gear 340. A hole 344 is formed at a center of the plate 342, and the outer peripheral surface of the nut 400 may be fitted into the hole 344 in the extension direction of the nut 400. The cross-sectional shapes of the outer peripheral surface of the nut 400 and the hole 344 are not limited as long as the nut 400 may be fixedly inserted into the hole 344.

As illustrated in FIG. 4, a second ring gear plate 342 is formed at a front side of the second ring gear 340 to cover the front side of the second ring gear 340. The second ring gear plate 342 may be integrated with the second ring gear 340 and has the hole 344 formed at the center thereof.

In this case, the nut 400 is inserted into the hole 344 in the longitudinal direction. To this end, a cross-section of the hole 344 corresponds to a cross-section of the nut 400 so that the outer peripheral surface of the nut 400 is in contact with the inner peripheral surface of the hole 344. In this case, a rotation part is provided between the nut 400 and the second ring gear plate 342 so that the nut 400 may rotate along with the rotation of the second ring gear 340 that is rotated by the rotational driving power of the motor 100.

The shape of the rotation stopper is not limited as long as the nut 400 may rotate together with the second ring gear 340. For example, in the present embodiment, a cut-out surface may be provided. More specifically, as illustrated in FIG. 5, a first cut-out surface 402 may be formed on the outer peripheral surface of the nut 400 in the extension direction of the nut 400, i.e., the longitudinal direction of the pressing screw 200. In this case, a second cut-out surface 104 may be formed on the inner peripheral surface of the hole 344 and disposed at a position corresponding to the first cut-out surface 402. Therefore, the nut 400 may rotate when the second ring gear 340 rotates in the state in which the nut 400 is fitted with the second ring gear plate 342 so that the outer peripheral surface of the nut 400 is in contact with the inner peripheral surface of the hole 344.

Meanwhile, as illustrated in FIG. 4, the second ring gear plate 342 is disposed at the front side, such that the second ring gear plate 342 also serves to support the front surface of the rotary body 336 so that the planet gear structure 330 does not separated forward.

Meanwhile, the nut 400 of the electromechanical brake 1 according to the embodiment of the present disclosure may further include a support portion 410.

As illustrated in FIG. 2, the support portion 410 protrudes outward from the outer peripheral surface of the front end of the nut 400 to prevent the nut 400 from separating rearward from the second ring gear plate 342. Therefore, the support portion 410 is formed in a circular plate shape having a hole at a center thereof, and the pressing screw 200 may penetrate the hole.

When the pressing screw 200 is moved forward by the rotation of the nut 400 and presses the disc 20 through the second brake pad 40, an axial force is applied to the pressing screw 200, and a load is applied to the rear side of the pressing screw 200.

In this case, a rear surface of the support portion 410 is supported on a front surface of the second ring gear plate 342, which makes it possible to prevent the nut 400 from moving rearward while penetrating the hole 344 of the second ring gear plate 342.

The electromechanical brake 1 according to the embodiment of the present disclosure may further include a thrust bearing 500 and a force sensor 600.

As illustrated in FIG. 3, the thrust bearing 500 may be disposed between the rear surface of the support portion 410 and the front surface of the second ring gear plate 342. That is, a rear surface of the thrust bearing 500 is in contact with the front surface of the second ring gear plate 342, and a front surface of the thrust bearing 500 is in contact with the rear surface of the support portion 410 and supports the nut 400 to which the load is applied.

In this case, although not illustrated in the drawings, the force sensor 600 may be disposed forward of the thrust bearing 500 to measure the axial force applied to the pressing screw 200. However, the force sensor 600 may be disposed forward of the thrust bearing 500. Therefore, the force sensor 600, together with the thrust bearing 500, is disposed between the rear surface of the plate 342 of the second ring gear 340 and the inner surface of the cover 56.

The load measured by the force sensor 600 may be used to determine intensity of the user's pedal effort applied to a pedal or used by a controller to measure a brake pressing degree during autonomous driving.

Hereinafter, an operation of the electromechanical brake 1 according to the embodiment of the present disclosure will be described in detail with reference to FIGS. 6 and 7.

Figure 6:
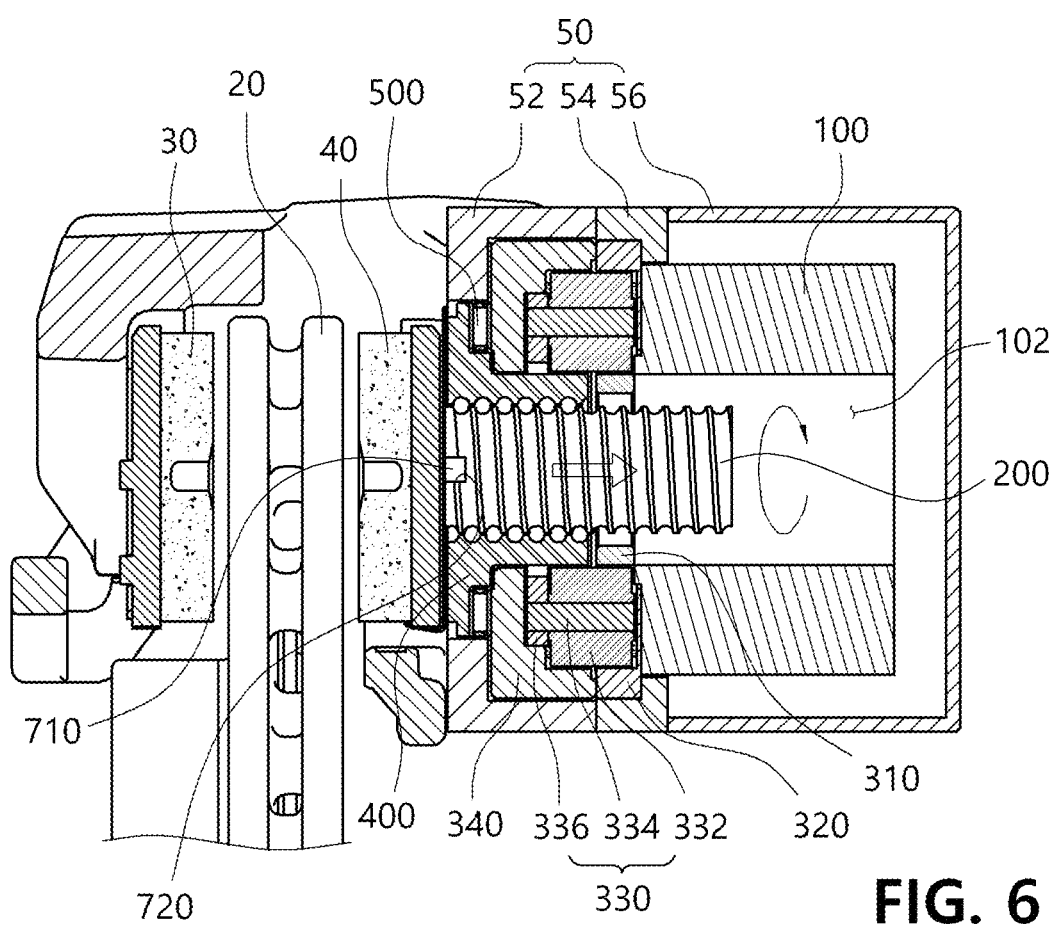
FIG. 6 is a view illustrating a braking state of the electromechanical brake according to the embodiment of the present disclosure.

FIG. 6 is a view illustrating a braking state of the electromechanical brake according to the embodiment of the present disclosure. FIG. 7 is a traveling state of the electromechanical brake according to the embodiment of the present disclosure.

As illustrated in FIG. 6, in the state in which the electromechanical brake 1 presses the disc 20, the rotational driving power generated by the motor 100 is transmitted to the nut 400 through the Power train 300.

Therefore, the nut 400 rotates in one direction, and the pressing screw 200 coupled to the nut 400 by ball-screw-nut coupling receives the rotational force. In this case, because the guide protrusion 710 formed at the front side of the pressing screw 200 is supported by the inner surface of the guide groove 720, the pressing screw 200 moves forward in the protruding direction of the guide protrusion 710 without rotating together with the nut 400.

In this case, the front surface of the pressing screw 200 presses the second brake pad 40 and presses the disc 20 through the second brake pad 40.

Figure 7:
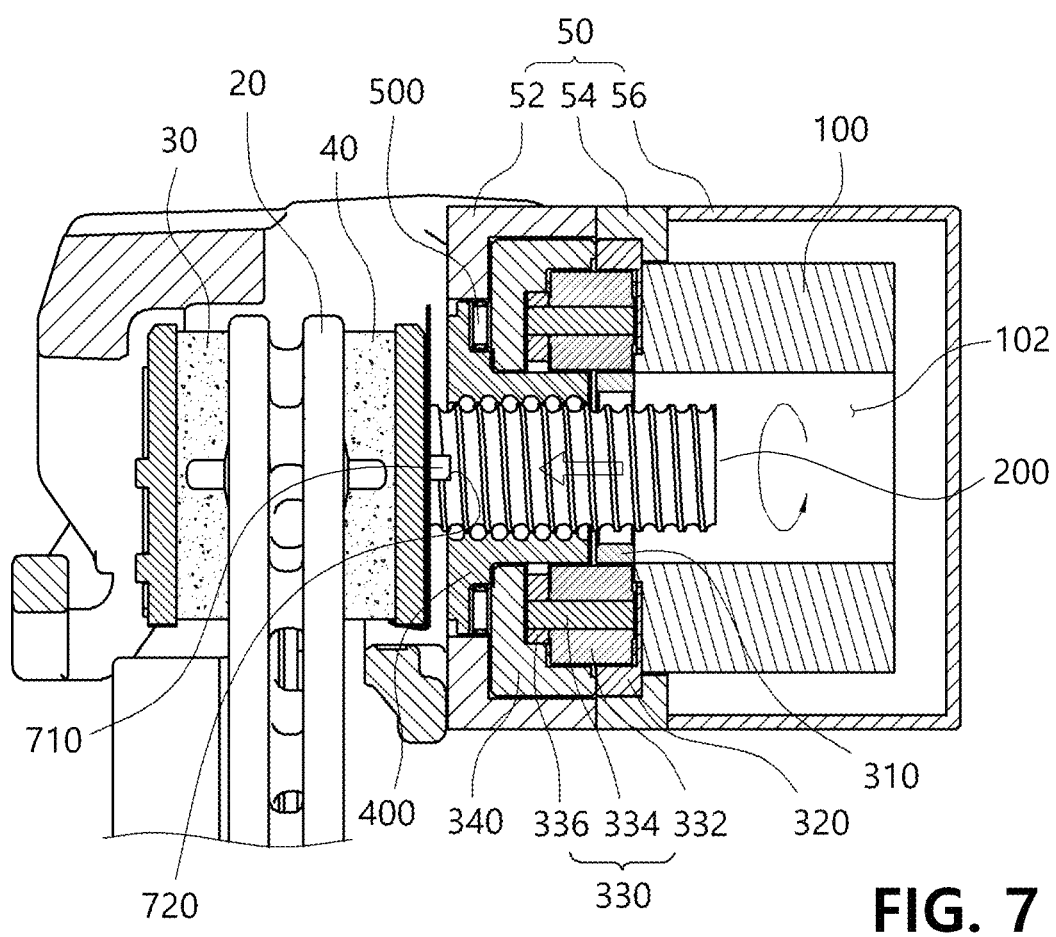
FIG. 7 is a traveling state of the electromechanical brake according to the embodiment of the present disclosure.

In contrast, as illustrated in FIG. 7, in case that the operation of pressing the disc 20 is stopped and the vehicle switches to the traveling state, the motor 100 transmits reverse rotational driving power to the nut 400 through the Power train 300.

Therefore, the nut 400 rotates in the reverse direction, and the pressing screw 200 moves rearward in the protruding direction of the guide protrusion 710 without rotating together with the nut 400 because the guide protrusion 710 is supported by the inner surface opposite to the guide groove 720. Therefore, the pressing screw 200 does not press the second brake pad 40 any further. Therefore, the disc 20 may rotate without constraint.

Hereinafter, an electromechanical brake 1 according to another embodiment of the present disclosure will be described with reference to FIG. 8. However, the description of the contents described in the above-mentioned embodiment of the present disclosure will be omitted.

Figure 8:
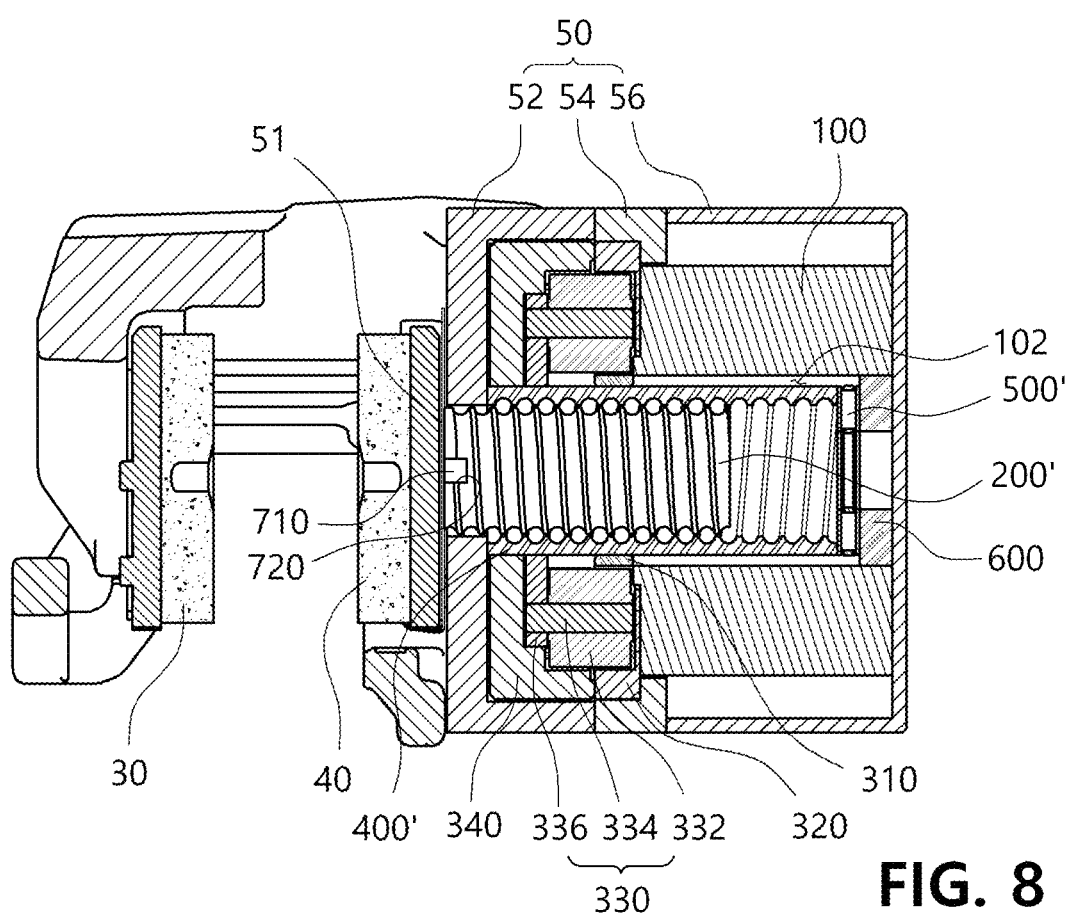
FIG. 8 is a longitudinal cross-sectional view of a pressing screw and a motor of an electromechanical brake according to another embodiment of the present disclosure.

FIG. 8 is a longitudinal cross-sectional view of a pressing screw and a motor of an electromechanical brake according to another embodiment of the present disclosure.

As illustrated in FIG. 8, a nut 400' of the electromechanical brake 1 according to another embodiment of the present disclosure extends rearward. Therefore, a rear end of the nut 400' is disposed in the internal space of the hollow motor 100. In this case, a rear end surface of the nut 400' is supported by the inner surface of the cover 56, and a front end surface of the nut 400' is supported by the rear surface of the front housing 52.

As illustrated in FIG. 8, in case that the rotational driving power is transmitted to the nut 400' through the Power train 300 by the rotation of the motor 100, the nut 400' rotates, and the pressing screw 200 moves forward or rearward. When the pressing screw 200 moves forward and presses the disc 20 through the second brake pad 40, an axial force is applied to the pressing screw 200, and a load is applied to the rear side of the pressing screw 200. In this case, the rear end surface of the nut 400' extending rearward is strongly supported by the inner surface of the cover 56. In this case, a thrust bearing 500' may be disposed between the rear end surface of the nut 400' and the inner surface of the cover 56 to prevent the inner surface of the cover 56 from being damaged by the rotation of the nut 400'. In addition, the embodiment of the present disclosure, a force sensor 600' may be disposed rearward or forward of the thrust bearing 500' to measure a load according to the axial force of the pressing screw 200.

The electromechanical brake according to the embodiment of the present disclosure may provide the braking force to the vehicle by pressing the disc by using the driving power of the motor without a hydraulic line.

According to the electromechanical brake according to the embodiment of the present disclosure, the first ring gear and the second ring gear engage with the planet gear integrated to transmit the driving power of the motor, which makes it possible to improve the power transmission efficiency of the Power train.

According to the electromechanical brake according to the embodiment of the present disclosure, the pressing screw and the nut are coupled by ball-screw-nut coupling, which may relatively reduce damage and a backlash of the pressing screw in the braking environment in which dust and foreign substances are easily produced.

The effects of the present disclosure are not limited to the above-mentioned effects, and it should be understood that the effects of the present disclosure include all effects that may be derived from the detailed description of the present disclosure or the appended claims.

The electromechanical brake according to the embodiments of the present disclosure has been described above. In the present specification, the present disclosure provides the arrangement structure of the Power train having the planet gear structure for efficiently transmitting the rotational driving power of the motor and improving the durability of the internal components while using the motor to press the disc.

It can be clearly understood, by those skilled in the art to which the present disclosure pertains, that the electromechanical brake according to the present embodiment may be applied not only to the brake system for a vehicle, but also to a brake for braking any rotating object.

While the exemplary embodiments according to the present disclosure have been described above, it is obvious to those skilled in the art that the present disclosure may be specified in other particular forms in addition to the aforementioned embodiments without departing from the spirit or the scope of the present disclosure. Accordingly, it should be understood that the aforementioned embodiments are not restrictive but illustrative, and thus the present disclosure is

| DESCRIPTION OF REFERENCE NUMERALS |
| --- |
| 1: Electromechanical brake |
| 20: Disc |
| 30: First brake pad |
| 40: Second brake pad |
| 50: Housing |
| 51: Plate |
| 52: Front housing |
| 54: Cover fixing member |
| 55: Fixing groove |
| 56: Cover |
| 60: Carrier |
| 100: Motor |
| 102: Internal space |
| 104: Second cut-out surface |
| 200: Pressing screw |
| 300: Power train |
| 310: Sun gear |
| 320: First ring gear |
| 322: Fixing protrusion |
| 330: Planet gear structure |
| 332: Planet gear |
| 334: Rotation shaft |
| 336: Rotary body |
| 340: Second ring gear |
| 342: Second ring gear plate |
| 344: Hole |
| 400: Nut |
| 402: First cut-out surface |
| 410: Support portion |
| 500: Thrust bearing |
| 600: Force sensor |
| 700: Guide |
| 710: Guide protrusion |
| 720: Guide groove |

What is claimed is:

1. An electromechanical brake, which includes a pair of brake pads disposed at two opposite sides of a disc, the electromechanical brake comprising:
a hollow motor configured to provide rotational driving power and having an internal space formed in a direction in which a rotation axis extends;
a nut configured to rotate about the rotation axis of the motor;
a power train coupled to a front side of the motor and configured to transmit the rotational driving power of the motor to the nut; and
a pressing screw coupled to the nut and configured to advance or retreat toward the brake pad,
wherein the power train comprises:
a sun gear coupled to the motor and configured to be rotated about the rotation axis by the rotational driving power of the motor;
a planet gear structure disposed outside the sun gear and comprising one or more planet gears each having a rear end that engages with the sun gear;
a first ring gear having an inner portion that engages with the rear ends of the one or more planet gears;
a second ring gear having an inner portion that engages with front ends of the one or more planet gear; and
a second ring gear plate covering a front side of the second ring gear,
wherein the nut is coupled to the second ring gear and rotates about the rotation axis together with the second ring gear, and
wherein the electromechanical brake further comprises:
a cover covering at least a part of the motor; and
a thrust bearing disposed between a front surface of the second ring gear plate and the nut to support a load generated by an axial force of the pressing screw.

2. The electromechanical brake of claim 1, wherein the number of gear teeth of the first ring gear is different from the number of gear teeth of the second ring gear.

3. The electromechanical brake of claim 1, further comprising:
a guide provided at an end of the pressing screw at a side of the brake pad to prevent the pressing screw from rotating together with the nut.

4. The electromechanical brake of claim 3, wherein the Guide comprises:
a plate provided outside the brake pad and disposed in parallel with the brake pad;
a guide protrusion protruding from the plate; and
a guide groove recessed in a front end surface of the pressing screw in a longitudinal direction of the pressing screw so that the protrusion is seated.

5. The electromechanical brake of claim 4, wherein the guide groove is formed at one side of the front end surface.

6. The electromechanical brake of claim 1, wherein the second ring gear plate is provided at the front side of the second ring gear, the second ring gear plate has a hole formed at a center thereof, an outer peripheral surface of the nut corresponds to an inner peripheral surface of the hole so that the nut is inserted into the hole in a longitudinal direction, and a rotation stopper is provided between the nut and the second ring gear plate so that the nut is rotatable together with the second ring gear.

7. The electromechanical brake of claim 6, wherein the rotation stopper comprises:
a first cut-out surface formed on the outer peripheral surface of the nut in a longitudinal direction of the pressing screw; and
a second cut-out surface formed on the inner peripheral surface of the hole of the second ring gear plate and corresponding to the first cut-out surface.

8. The electromechanical brake of claim 1, wherein the nut has a support portion protruding in a radial direction from an outer peripheral surface of a front end of the nut.

9. The electromechanical brake of claim 8,
wherein the thrust bearing is disposed between a rear surface of the support portion of the nut and the front surface of the second ring gear plate to support the load according to the axial force of the pressing screw.

10. The electromechanical brake of claim 8,
wherein the second ring gear plate is provided at the front side of the second ring gear to cover the front side of the second ring gear; and
the electromechanical brake further comprises a force sensor configured to measure the load according to the axial force of the pressing screw.

11. The electromechanical brake of claim 1, wherein the pressing screw is coupled to the nut by ball-screw-nut coupling.

12. An electromechanical brake, which includes a pair of brake pads disposed at two opposite sides of a disc, the electromechanical brake comprising:
a hollow motor configured to provide rotational driving power and having an internal space formed in a direction in which a rotation axis extends;
a nut configured to rotate about the rotation axis of the motor;

a power train coupled to a front side of the motor and configured to transmit the rotational driving power of the motor to the nut; and a pressing screw coupled to the nut and configured to advance or retreat toward the brake pad, wherein the power train comprises:

a sun gear coupled to the motor and configured to be rotated about the rotation axis by the rotational driving power of the motor;

a planet gear structure disposed outside the sun gear and comprising one or more planet gears each having a rear end that engages with the sun gear;

a first ring gear having an inner portion that engages with the rear ends of the one or more planet gears; and a second ring gear having an inner portion that engages with front ends of the one or more planet gears, wherein the nut is coupled to the second ring gear and rotates about the rotation axis together with the second ring gear, the nut extends rearward in a longitudinal direction, and a rear end of the nut is disposed in the internal space of the motor, and wherein the electromechanical brake further comprises:

a cover covering at least a rear end of the motor; and a thrust bearing disposed between an inner surface of the cover and a rear end surface of the nut to support a load generated by an axial force of the pressing screw.

13. The electromechanical brake of claim 12, further comprising a force sensor disposed between an inner surface of the cover and a rear end surface of the nut to measure the load according to the axial force of the pressing screw.

14. A vehicle comprising:

the electromechanical brake of claim 1;

a vehicle wheel having one side to which the disc is coupled so that rotation axes of the vehicle wheel and the disc are coincident with each other; and the pair of brake pads disposed at the two opposite sides of the disc and coupled to the electromechanical brake.

\* \* \* \* \*